United States Patent [19]

Sasaki et al.

[11] Patent Number: 5,270,893
[45] Date of Patent: Dec. 14, 1993

[54] SPECIFIC CORE STRUCTURE IN A MAGNETO-RESISTANCE HEAD

[75] Inventors: Mamoru Sasaki; Hideo Suyama; Takuji Shibata; Kenichiro Tsunewaki, all of Miyagi, Japan

[73] Assignee: Sony Corporation, Tokyo, Japan

[21] Appl. No.: 783,166

[22] Filed: Oct. 28, 1991

[30] Foreign Application Priority Data

Oct. 29, 1990 [JP] Japan ................................ 2-291330

[51] Int. Cl.$^5$ ........................ C11B 5/39; C11B 5/147
[52] U.S. Cl. ..................................... 360/113; 360/126
[58] Field of Search ................................ 360/113, 126

[56] References Cited

U.S. PATENT DOCUMENTS 4,807,076 2/1989 Nakashima et al. ............... 360/126
4,885,649 12/1989 Das ................................... 360/113

Primary Examiner—Edward P. Westin
Assistant Examiner—Benjamin D. Driscoll
Attorney, Agent, or Firm—Hill, Steadman & Simpson

[57] ABSTRACT

A magneto-resistance effect type thin film magnetic head which does not produce significant Barkhausen noises and has stabilized characteristics even where the track width is smaller than, for example, 10 μm. The magnetic head comprises a base member, a lower layer thin film magnetic core and an upper layer thin film magnetic core layered on the base member in such a manner that a magnetic gap is formed between front ends thereof, the gap being open to an opposing face of the magnetic head which is in contact with or opposed to a magnetic record medium, and a magneto-resistance effect magnetic sensing section disposed in the magnetic gap between the lower and upper layer thin film magnetic cores. The front end of the lower layer thin film magnetic core which defines the magnetic gap has a width selected to be smaller than the width of the front end of the upper layer thin film magnetic core which defines the magnetic gap so as to define a track width of the magnetic gap.

9 Claims, 8 Drawing Sheets

SPECIFIC CORE STRUCTURE IN A MAGNETO-RESISTANCE HEAD

BACKGROUND OF THE INVENTION

1. Field of the Invention

This invention relates to a thin film magnetic head of a magneto-resistance effect type.

2. Description of the Prior Art

A magnetic head of the magneto-resistance effect type is employed for various magnetic heads, for example, as a reproducing magnetic head of a magnetic recording and reproducing head assembly of a hard disk drive unit due to its superiority in high sensitivity in short wavelength. It is advantageous for a magneto-resistance effect type thin film magnetic head to adopt a shield type construction in order to assure a high resolution. A magneto-resistance effect type reproducing thin film magnetic head having such shield type construction can be made as a composite thin film magnetic head wherein it is formed as a unitary member together with a magnetic head of the inductive type acting as a recording magnetic head.

An exemplary one of conventional magneto-resistance effect type thin film magnetic head of such composite type is shown in FIGS. 9, 10 and 11 and 12 wherein such magnetic head is constructed as a floating type magnetic head. Referring to FIGS. 9 to 11, the magnetic head shown includes a base member 1 formed either from a slider which is caused to float by an air flow produced in response to rotation of a magnetic record medium such as, for example, a hard disk or from a base plate mounted on such slider. A lower layer thin film magnetic core 3 and an upper layer thin film magnetic core 4 are formed in an overlapping relationship on the base member 1 such that front ends thereof define therebetween a magnetic gap g opened to an opposing face of the magnetic head at which the magnetic head is contacted with or opposed to the magnetic record medium, that is, an air bearing surface 2 or the floating magnetic head. A magneto-resistance effect magnetic sensing section 5 is disposed in the magnetic gap g between the lower layer thin film magnetic core 3 and upper layer thin film magnetic core 4 and includes a magneto-resistance effect thin film which extends rearwardly from the magnetic gap g. A pair of electrodes 15a and 15b are formed at front and rear ends of the magneto-resistance effect magnetic sensing section 5.

A biasing conductor 7 in the form of a thin film conductive layer is formed between the lower and upper layer thin film magnetic cores 3 and 4 perpendicularly across the magneto-resistance effect magnetic sensing section 5 with a pair of insulator layers 6 interposed between the biasing conductor 7 and the lower layer thin film magnetic core 3 and between the biasing conductor 7 and the upper layer thin film magnetic core 4. The upper layer thin film magnetic core 4 is magnetically coupled at a rear end thereof to the lower layer thin film magnetic core 3, for example, through a window formed in the insulating layers 6 such that a closed magnetic path including the magnetic gap g therein is formed by the lower and upper layer thin film magnetic cores 3 and 4.

A head winding 8 in the form of a thin film conductive layer is formed, for example, on the lower layer thin film magnetic core 3 with another insulating layer 6 interposed therebetween, for example, in a spiral pattern such that it may surround the rear ends of the upper and lower layer thin film magnetic cores 4 and 3 at which the upper and lower thin film magnetic cores 4 and 3 are magnetically coupled to each other. The head winding 8 may be formed, for example, simultaneously with formation of the biasing conductor 7.

According to such thin film magnetic head, a magneto-resistance effect type magnetic head of the shield type is constructed such that the magneto-resistance effect magnetic sensing section 5 is disposed in the magnetic gap g defined between the front ends of the lower and upper layer thin film magnetic cores 3 and 4 in a condition wherein it is opened to a face, for example, the air bearing surface 2, of the magnetic head which is to contact with or is opposed to the magnetic record medium such that the magnetic cores 3 and 4 are constructed as magnetic shielding members. Thus, a signal magnetic field recorded on the magnetic record medium is applied to the magneto-resistance effect magnetic sensing section 5 by way of the magnetic gap g. In the meantime, a sensing current is flowed between the electrodes 15a and 15b through the magneto-resistance effect magnetic sensing section 5 while a required current is supplied to the biasing conductor 7. A magnetic field is thus produced by the biasing conductor 7 and applied to the magneto-resistance effect magnetic sensing section 5. Consequently, the magneto-resistance characteristic region of the magneto-resistance effect magnetic sensing section 5 which indicates a high sensitivity in a required magnetized condition and indicates a linearity is rendered operative. Thus, a variation in magnetic reluctance caused by a signal magnetic field provided from the magnetic record medium through the magnetic gap g as described is detected as a variation in voltage between the electrodes 15a and 15b.

On the other hand, upon recording upon the magnetic record medium, supply of a current to the biasing conductor 7 is stopped, and also supply of the sensing current $i_5$ to the magneto-resistance effect magnetic sensing section 5 is stopped while a required current is now supplied to the head winding 8 in accordance with recording information. Consequently, a magnetic field produced in the closed magnetic path by the lower and upper layer thin film magnetic cores 3 and 4 is extracted from the magnetic gap g to effect magnetic recording upon the magnetic record medium. Thus, the magneto-resistance effect type thin film magnetic head is constructed as a composite magnetic head of a magneto-resistance effect type reproducing magnetic head and an inductive type recording magnetic head.

The composite magnetic head of a magneto-resistance effect type thin film magneto head with an inductive type recording magnetic head is manufacture in the following manner. Referring to FIGS. 12 to 14 in which the magnetic head is shown at a step in manufacturing the same, when such composite magnetic head of the magneto-resistance effect type is to be manufactured, a magnetic alloy such as, for example, FeNi is first plated, for example, by well known frame plating on a base member 1 under the application of a magnetic field, and then the frame which is made of a photo-resist or the like is removed and also the magnetic alloy at an unnecessary portion outside the region of the thus removed frame is removed by etching to form a lower layer thin film magnetic core 3.

The lower layer thin film magnetic core 3 is normally formed with a sufficiently great area comparing with a track width $W_T$ of a magnetic gap g to be finally obtained, that is, such a great area that it finally includes an entire region of a pattern of an upper layer thin film magnetic core 4. Then, a non-magnetic insulating layer 6 to $SiO_2$, $Al_2O_3$ or the like is formed by sputtering or by some other well known method over an entire region of the lower layer thin film magnetic core 3 formed in a required pattern of a wide area in this manner, and a surface of the insulating layer 6 is flattened. After then, such a magneto-resistance effect magnetic sensing section 5, a pair of electrodes 15a and 15b and so forth as described hereinabove are formed on the thus flattened surface of the insulating layer 6, and a biasing conductor 7, a head winding 8 and so forth are formed on them with an insulator layer 6 interposed therebetween. Further, an upper layer thin film magnetic core 4 is formed on them with another insulator layer 6 interposed therebetween such that it is magnetically coupled at a rear end portion thereof directly or by way of a non-magnetic layer to the lower layer thin film magnetic core 3, for example, through a window perforated in the insulating layers 6. Then, the thus obtained head block is polished from its front side to a location indicated by a chain line a in FIGS. 12 and 15 to form such an air bearing surface 2 as shown in FIGS. 9 and 11.

In this instance, the upper layer thin film magnetic core 4 is formed by plating a magnetic alloy such as FeNi, for example, over an entire region under the application of an external magnetic field in a predetermined direction similarly as in formation of the lower layer thin film magnetic core 3 and then etching the plated magnetic alloy film in a required pattern. Particularly, the upper layer thin film magnetic core 4 is formed in such a pattern that a narrow constricted portion 4a (FIG. 15) having a width corresponding to a required track width $W_T$ is formed at a location thereof at which a magnetic gap g is to be formed as shown in FIG. 12.

However, where the track width $W_T$ of a magneto-resistance effect type thin film magnetic head obtained in this manner is smaller than 10 μm, a problem takes place that Barkhausen noises are produced significantly.

Further, a magneto-resistance effect type thin film magnetic head having such a construction as described above has another problem that such magnetic heads likely have different characteristics.

The inventors of the present invention have made various experiments and investigations and have found out that, where the lower layer thin film magnetic core 3 is formed in a magnetic core pattern of a wide area as described above, the problems arise from the fact that some disorder of magnetic domains takes place at the magneto-resistance effect magnetic sensing section 5 and upper layer thin film magnetic core 4 which are formed on such lower layer thin film magnetic core 3.

In particular, the magneto-resistance effect magnetic sensing section 5 of the magneto-resistance effect type thin film magnetic head having such construction as described above is required to be constructed such that the axis of easy magnetization thereof is directed in a track widthwise direction in order to assure a high sensitivity.

In order to direct the axis of easy magnetization of the magneto-resistance effect magnetic sensing section 5a in a track widthwise direction in this manner, such method is adopted that an external magnetic field is applied in such magnetic widthwise direction upon formation of a film of the magneto-resistance effect magnetic sensing section 5, that is, upon formation of a magneto-resistance effect thin film by vapor deposition or sputtering.

However, such external magnetic field is not very intense at the location of the magneto-resistance effect magnetic sensing section 5 because the base member 1 has a width of up to several inches. Accordingly, if the lower layer thin film magnetic core 3 of a great width is present below the magneto-resistance effect magnetic sensing section 5, then since the magnetic core 3 normally has a comparatively thick magnetic layer of several μm, the magnetic field to the location of the magneto-resistance effect thin film 5 is influenced and disordered by some absorption of the magnetic field by the lower layer thin film magnetic core 3. Consequently, magnetic domains of the magneto-resistance effect thin film present such an unstable, disordered condition wherein they are inclined relative to the track widthwise direction as seen in FIG. 15.

Further, where the lower layer thin film magnetic core 3 has a great width as described hereinabove, when the upper layer thin film magnetic core 4 is to be formed similarly on the lower layer thin film magnetic core 4, even if plating of a magnetic material is performed under the application of an external magnetic field, the magnetic field is similarly influenced significantly by the lower layer thin film magnetic core 3. Consequently, magnetic domains particularly at the constricted portion 4a of the upper layer thin film magnetic core 4 to form the magnetic gap g are not arranged in the track widthwise direction, but a magnetized condition in a depthwise direction of the magnetic gap takes place dominantly. Thus, it has been found out that Barkhausen noises are caused by such magnetized condition.

Further, where the track width $W_T$ is to be defined by the upper layer thin film magnetic core 4, it is necessary for the pattern of the upper layer thin film magnetic core 4 to be formed with reference to the location of the magneto-resistance effect thin film 3 formed as a lower layer. However, it has been found out that accurate setting of the upper layer thin film magnetic core at a predetermined position relative to the magneto-resistance effect magnetic sensing section in a condition wherein a biasing conductor or a head winding is formed and consequently the distance of the upper layer thin film magnetic core 4 from the magneto-resistance effect thin film is substantially increased will actually cause a deterioration in accuracy, which will cause a dispersion in characteristic among magneto-resistance effect type thin film magnetic heads.

SUMMARY OF THE INVENTION

It is an object of the present invention to provide a magneto-resistance effect type thin film magnetic head which does not produce significant Barkhausen noises and has stabilized characteristics even where the track width thereof is smaller than, for example, 10 μm.

While the present invention provides, based on such new knowledge obtained from the results of the experiments and investigations described above, a magneto-resistance effect type thin film magnetic head which is low in production of Barkhausen noises and allows manufacturing of magnetic heads which are uniform and stabilized in characteristic, the present invention has been made making the most of the fact that, when a magneto-resistance effect type thin film magnetic head performs a reproducing operation, upper and lower layer thin film magnetic cores have a function of shielding an unnecessary magnetic field to a magneto-resistance effect magnetic sensing section other than a necessary magnetic field to be read out from a magnetic record medium.

In particular, while a magnetic head of a structure wherein a pair of magnetic poles defining a magnetic gap therebetween have different widths is disclosed, for example, in Japanese Patent Laid-Open Application No. 62-92218, since it has such construction that reading of recorded information on a magnetic record medium, that is, reproduction, is performed not by a head of the magneto-resistance effect type but by a head of the inductive type, or in other words, a signal magnetic field from a magnetic record medium is picked up by the pair of magnetic poles themselves which define a magnetic gap therebetween, a problem of so-called fringing which is caused by a magnetic field between end edges of the magnetic poles upon reproduction is involved, and in coping with such problem, there is a restriction in difference in width between the pair of magnetic poles.

The present invention has been made for a quite different object and from a quite different conception, and since a magneto-resistance effect type thin film magnetic head has a construction of a magneto-resistance effect reproducing head with which no attention to such fringing is required, it can achieve sufficient improvement in stability and reduction in production of noises.

Thus, in order to attain the object, according to the present invention, there is provided a magneto-resistance effect type thin film magnetic head, which comprises a base member, a lower layer thin film magnetic core and an upper layer thin film magnetic core layered on the base member in such a manner that a magnetic gap is formed between front ends thereof and is opened to an opposing face of the magnetic head which is to contact with or opposed to a magnetic record medium, and a magneto-resistance effect magnetic sensing section disposed in the magnetic gap between the lower and upper layer thin film magnetic cores, the front end of the lower layer thin film magnetic core which defines the magnetic gap having a width selected to be smaller than the width of the front end of the upper layer thin film magnetic core which defines the magnetic gap so as to define a track width of the magnetic gap.

With the magneto-resistance effect type thin film magnetic head, the track width is defined by the lower layer thin film magnetic core, or in other words, the width of a portion of the lower layer thin film magnetic core at which the magnetic gap is formed is selected to be a small width corresponding to the track width. And, upon formation of the lower layer thin film magnetic core, and further upon formation of the magneto-resistance effect magnetic sensing section, that is, a magneto-resistance effect thin film, if, for example, plating, vapor deposition or sputtering is performed under the application of an external magnetic field, a good magnetic domain structure can be formed because any other magnetic core such as a thin film magnetic core of a wide area is present below or around the lower layer thin film magnetic core. According to such magnetic domain structure, magnetic domains can be formed well, that is, in a widthwise direction of a track also at a constricted portion of a reduced width of the lower layer thin film magnetic core defining the magnetic gap. Besides, magnetic domains can be arranged in such track widthwise direction also at the magneto-resistance effect magnetic sensing section and the axis of easy magnetization of the magneto-resistance effect magnetic sensing section can be set to a track width. Consequently, production of Barkhausen noises is low, and high and stabilized sensitivity is assured.

In this instance, since the magneto-resistance effect type thin film magnetic head has a construction as a magneto-resistance effect type reproducing head, there is no possibility of fringing at all, and accordingly, the front end of the upper layer thin film magnetic core can be formed with a sufficiently great width without being restricted by a difference between a width thereof from the width of the front end of the lower layer thin film magnetic core.

Further, with the magneto-resistance effect type thin film magnetic head, the magneto-resistance effect magnetic sensing section which may be a magneto-resistance effect type thin film is formed on the lower layer thin film magnetic core, and since the magneto-resistance effect magnetic sensing section is formed adjacent the lower layer thin film magnetic core, the relative positions between them can be set accurately, which is particularly significant with a composite magnetic head of a magneto-resistance effect type magnetic head and an inductive type magnetic head. Besides, since the magnetic gap is defined by the lower layer thin film magnetic core formed on the base member in a flattened condition, the pattern of the lower layer thin film magnetic core can be formed with a high degree of accuracy. Consequently, magneto-resistance effect type thin film magnetic heads which have no dispersion in characteristic and are superior in reproducibility can be manufactured.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
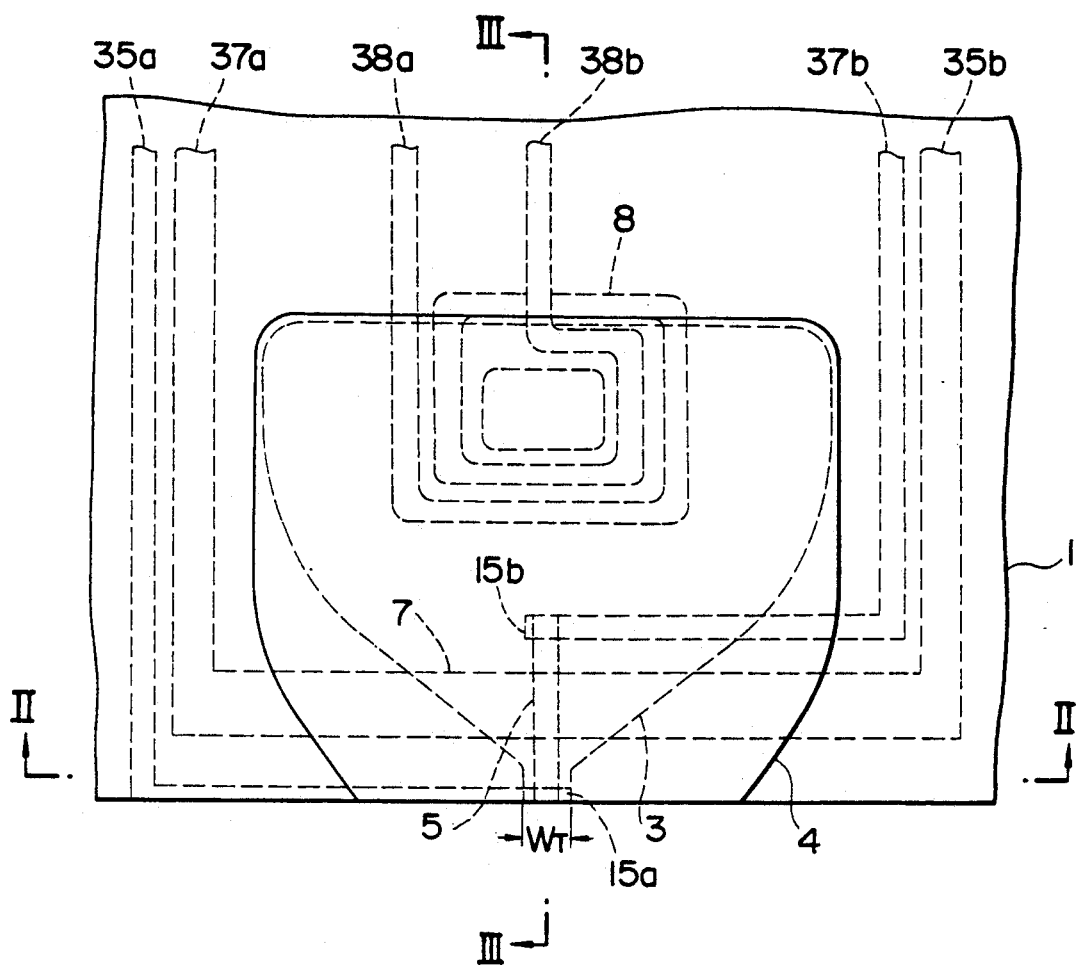
FIG. 1 is a schematic plan view of a magneto-resistance effect type thin film magnetic head showing a preferred embodiment of the present invention.
Figure 2:
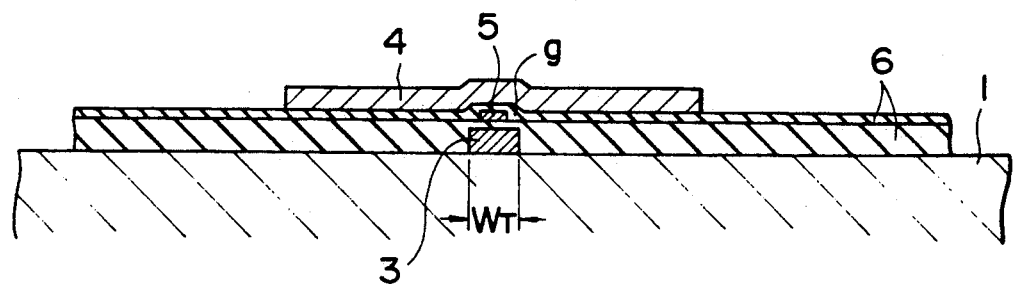
FIG. 2 is a sectional view taken along line II—II of FIG. 1.
Figure 3:
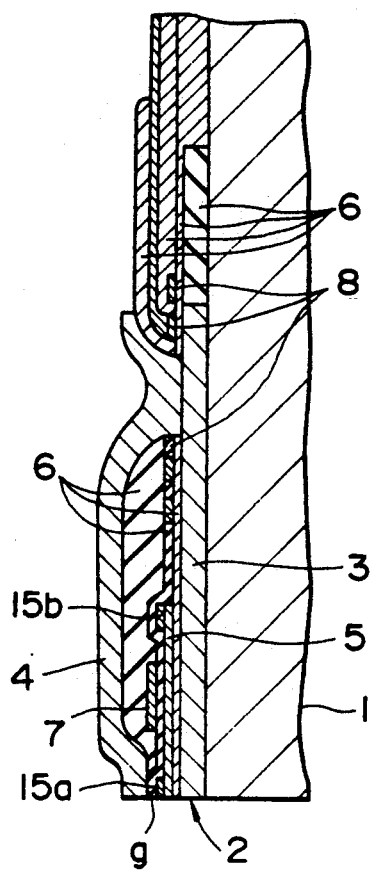
FIG. 3 is a sectional view taken along line III—III of FIG. 1.
Figure 9:
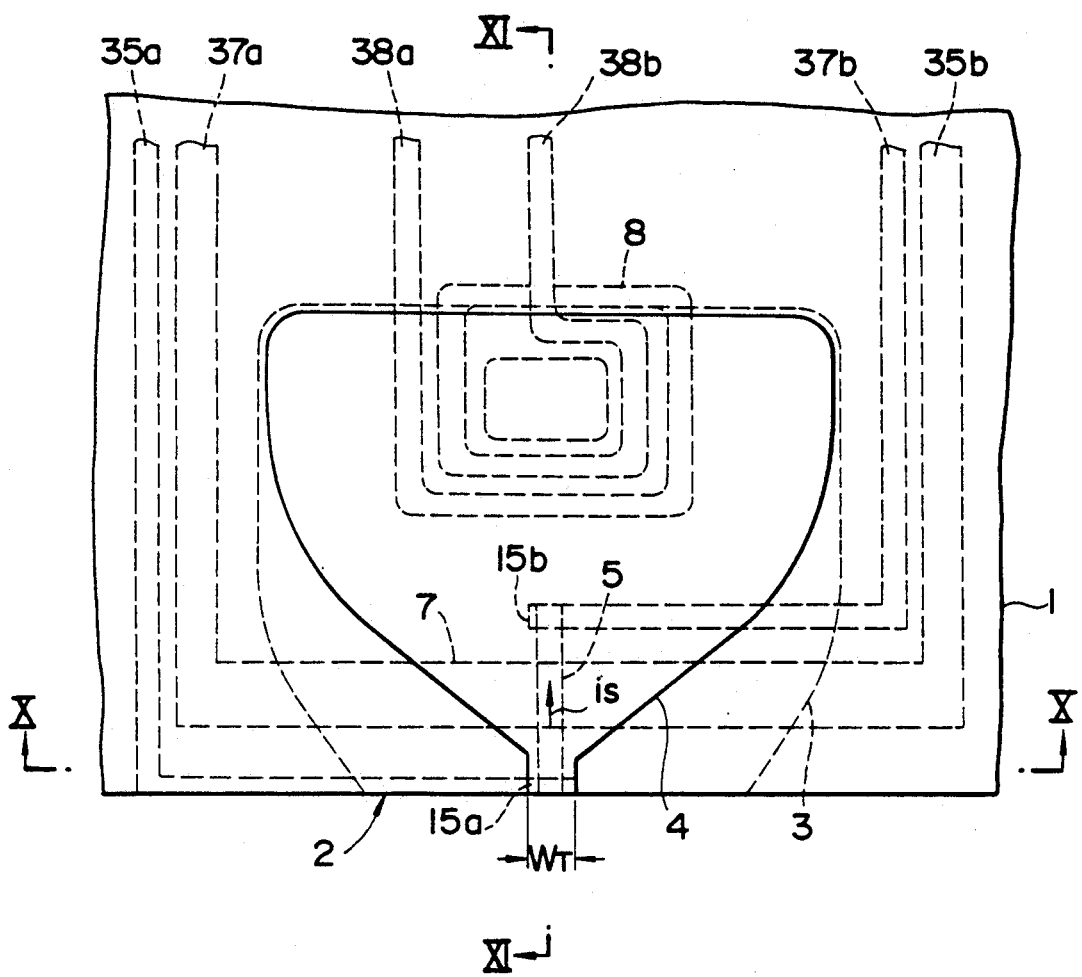
FIG. 9 is a schematic plan view showing a conventional magneto-resistance effect type thin film magnetic head.
Figure 10:
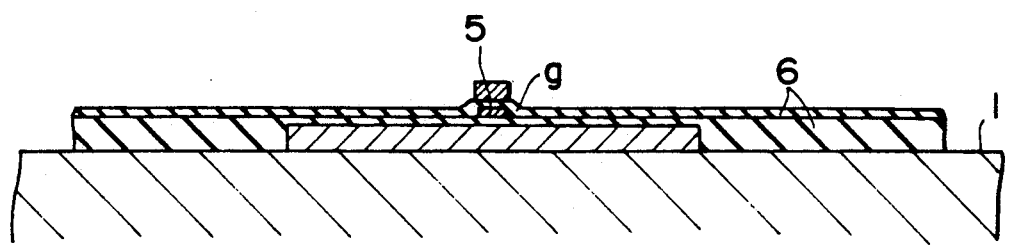
FIG. 10 is a sectional view taken along line X—X of FIG. 9.
Figure 11:
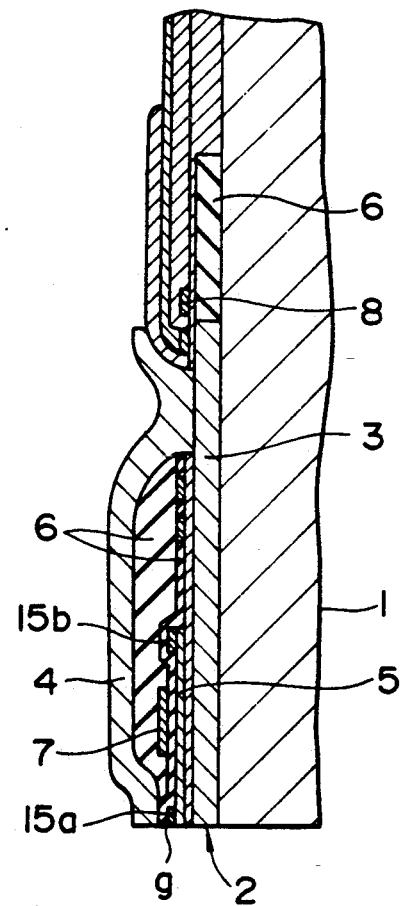
FIG. 11 is a sectional view taken along line IX—IX of FIG. 9.
Figure 12:
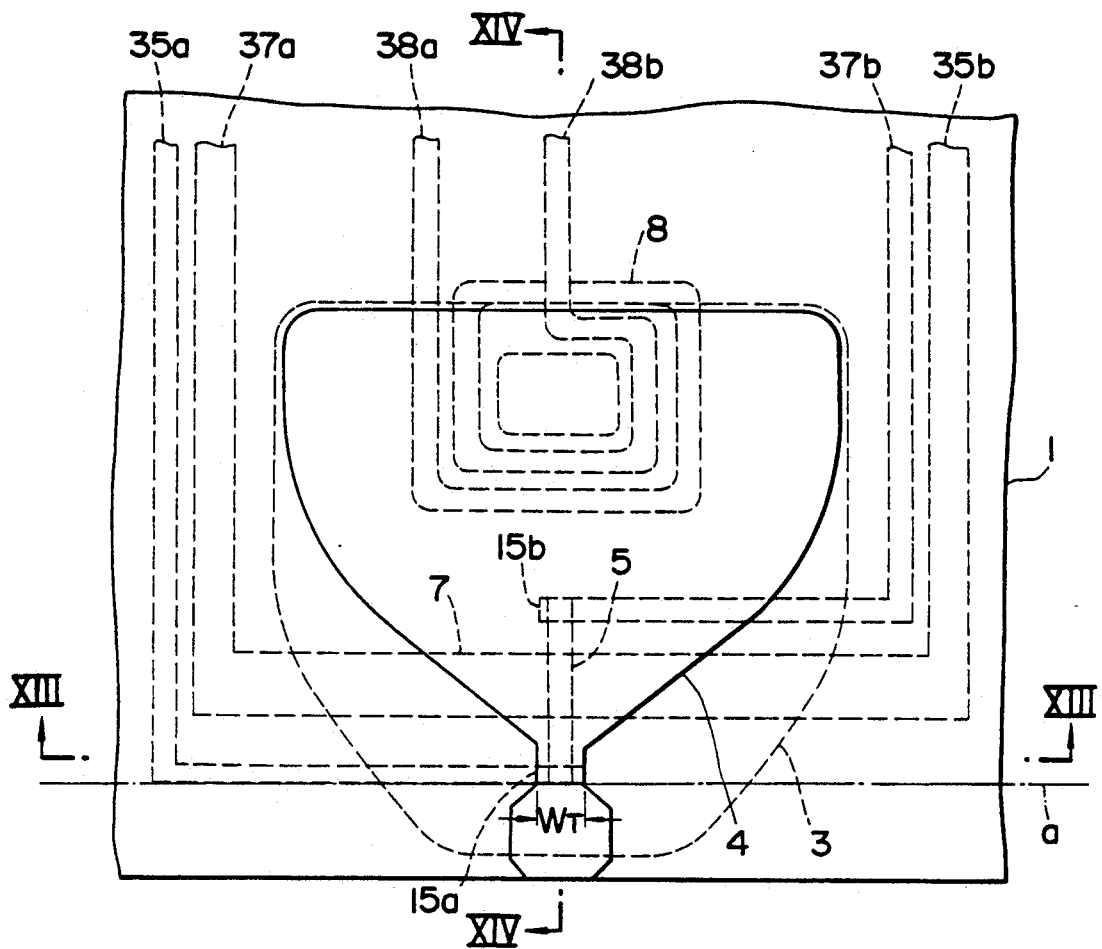
FIG. 12 is a schematic plan view showing the magneto-resistance effect type thin film magnetic head of FIG. 9 but at a step in manufacturing the same.
Figure 13:
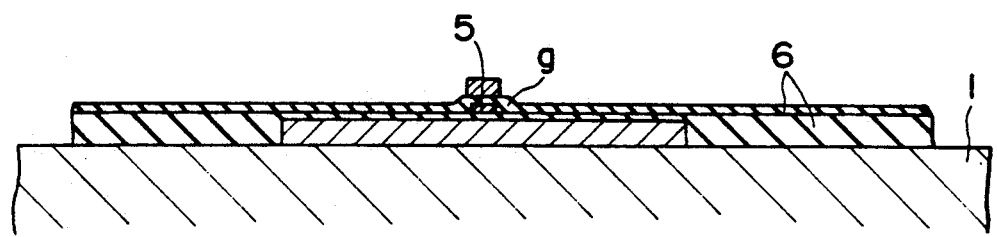
FIG. 13 is a sectional view taken along line XIII—XIII of FIG. 12.
Figure 14:
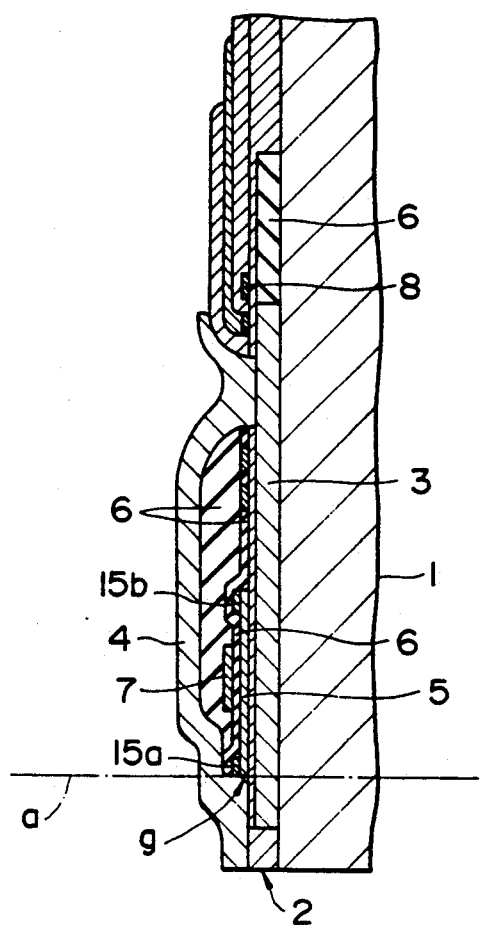
FIG. 14 is a sectional view taken along line XIV—XIV of FIG. 12.
Figure 15:
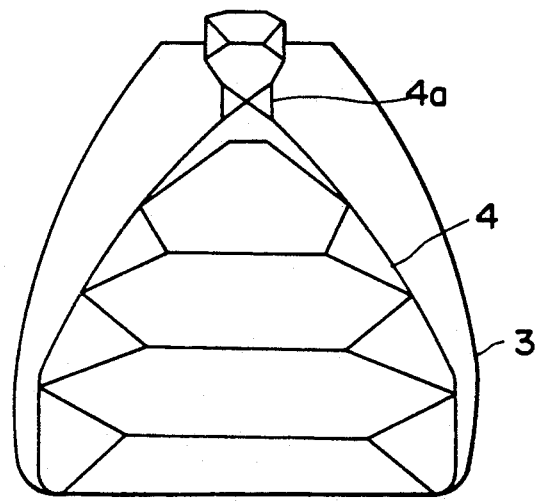
FIG. 15 is a schematic view illustrating a magnetic domain structure of a thin film magnetic core of the magneto-resistance effect type thin film magnetic head shown in FIG. 9.

Referring first to FIGS. 1 to 3, there is shown a magneto-resistance effect type thin film magnetic head according to the present invention in a completed condition. The magneto-resistance effect type thin film magnetic head is applied to a composite thin film magnetic head of a magneto-resistance effect type reproducing thin film magnetic head and an inductive type recording thin film magnetic head, and has a somewhat common construction to the conventional magneto-resistance effect type thin film magnetic head described hereinabove with reference to FIGS. 9 to 11 but is different from the conventional magnetic head in that, as particularly seen from FIG. 1 in comparison with FIG. 10, the front end of the lower layer thin film magnetic core 3 which defines the magnetic gap g has a width selected to be smaller than the width of the front end of the upper layer thin film magnetic core 4 which defines the magnetic gap g so as to define a track width of the magnetic gap g.

Figure 4:
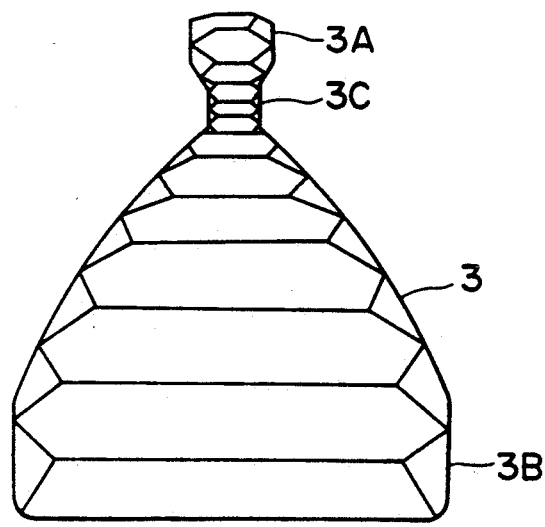
FIG. 4 is a schematic view illustrating a magnetic domain structure of a lower layer thin film magnetic core of the magneto-resistance effect type thin film magnetic head shown in FIG. 1.
Figure 5:
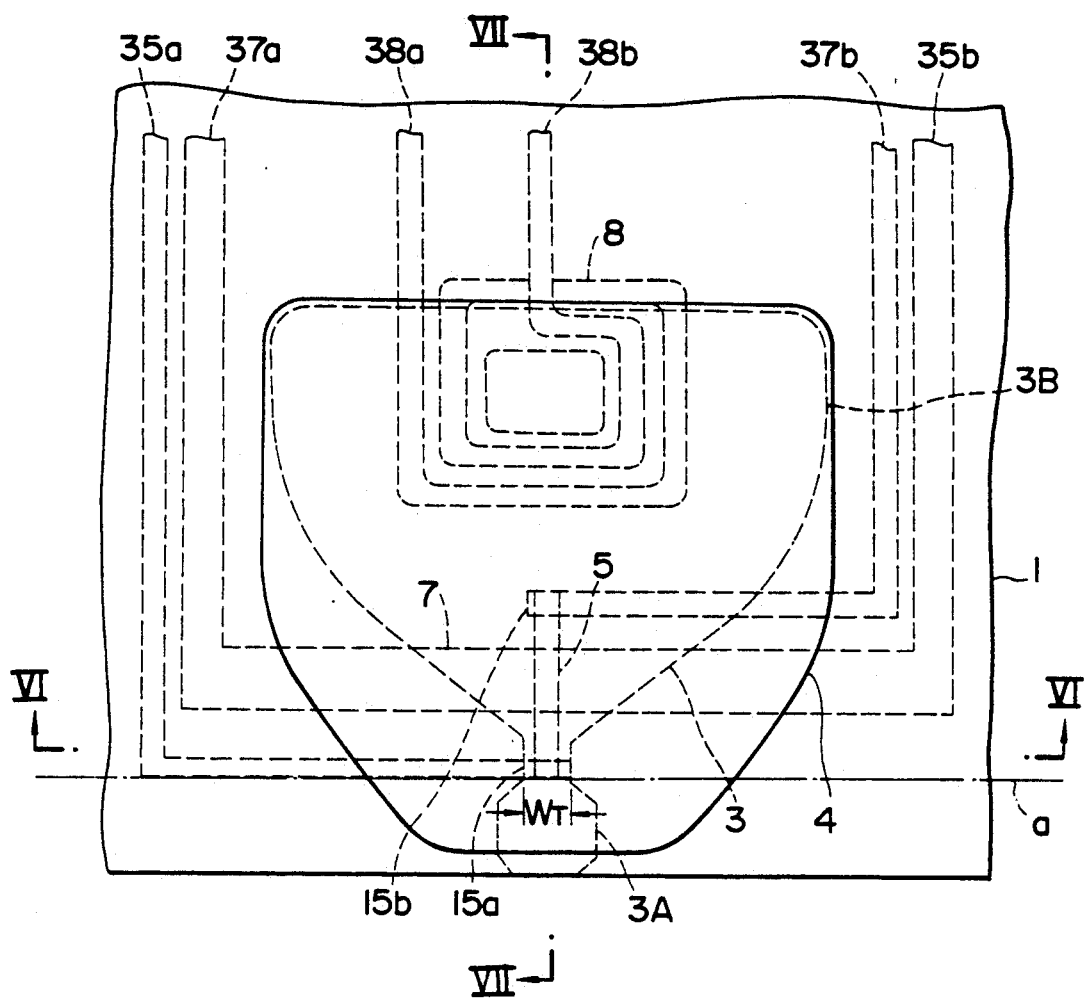
FIG. 5 is a schematic plan view showing the magneto-resistance effect type thin film magnetic head of FIG. 1 but at a step in manufacturing the same.
Figure 6:
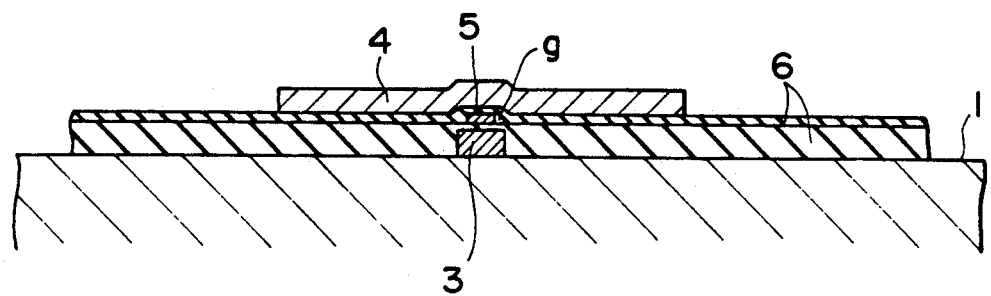
FIG. 6 is a sectional view taken along line VI—VI of FIG. 5.
Figure 7:
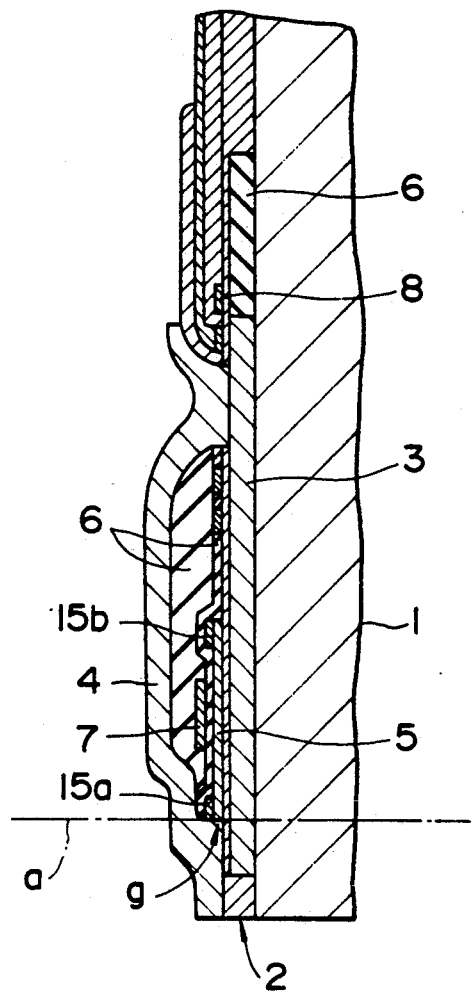
FIG. 7 is a sectional view taken along line VII—VII of FIG. 5.
Figure 8:
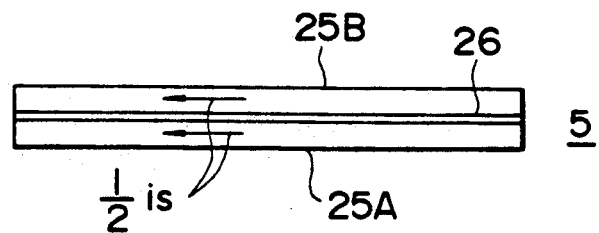
FIG. 8 is a diagrammatic sectional view of the magneto-resistance effect magnetic sensing section of the magneto-resistance effect type thin film magnetic head of FIG. 1.

The magneto-resistance effect type thin film magnetic head shown in FIGS. 1 to 3 is manufactured in the following manner. Referring now to FIGS. 6 to 8 in which the magneto-resistance effect type thin film magnetic head is shown in a condition at a step of manufacturing the same, in manufacturing such magneto-resistance effect type thin film magnetic head, a lower layer thin film magnetic core 3 of a magnetic substance such as, for example, FeNi is first formed in a required pattern by well-known so-called frame plating on a base member 1, which may be, where the magneto-resistance effect type thin film magnetic head is applied, for example, to a floating type magnetic head, a floating slider itself of the floating type magnetic head or a base plate mounted on such floating slider, in a condition wherein a required external magnetic field is applied, for example, in a widthwise direction of a track. After then, a pattern of photo-resist or the like from which the frame is formed is removed, and then an unnecessary plated layer around the region of the thus removed frame is removed by etching. The lower layer thin film magnetic core 3 is formed in a pattern which has a constricted portion 3C (FIG. 4) having a required track width $W_T$, for example, $W_T=4$ to 6 μm, a widened front portion 3A of a greater width on the front side of the constricted portion 3C, and a widened rear portion 3B having a sufficiently greater width than the widened front portion 3A.

Then, an insulator layer 6 of $SiO_2$, $Al_2O_3$ or the like is formed by sputtering or the like over an entire region on the lower layer thin film magnetic core 3 formed in this manner, and a surface of the insulator layer 6 is polished flat to obtain a flat face.

Subsequently, a magneto-resistance effect type magnetic sensing section 5 in the form of a magneto-resistance effect thin film of NiFe, NiCo, NiFeCo or the like is formed on the thus flattened insulator layer 6 with a width smaller than the width of the front end of the lower layer thin film magnetic core 3 described above, for example, with a width of 3 to 5 μm. The magneto-resistance effect type magnetic sensing section 5 can be constructed such that, for example, as shown in FIG. 8, it has a layered structure of a plurality of, for example, two, mutually magnetostatically coupled magneto-resistance effect thin films 25A and 25B with a non-insulating thin film 26 of $SiO_2$ or the like interposed therebetween and with little causing switched connection such that formation of magnetic domain walls may be prevented by magnetic coupling between the magneto-resistance effect thin films 25A and 25B to minimize Barkhausen noises.

Then, a pair of electrodes 15a and 15b are applied to the opposite front and rear ends of the magneto-resistance effect magnetic sensing section 5 such that they may be electrically coupled in an ohmic manner to the opposite ends of the magneto-resistance effect thin films 25A and 25B so that a predetermined sensing current may be supplied between the electrodes 15a and 15b while a sensing current $i_S/2$ is flowed in a same direction through both of the magneto-resistance effect thin films 25A and 25B of the magneto-resistance effect magnetic sensing section 5. Further, another insulating layer 6 of $SiO_2$ or the like is formed over the magneto-resistance effect magnetic sensing section 5, and then a biasing conductor 7 in the form of a thin film conductive layer is formed in a direction crossing the flowing direction of the sensing current $i_S$ through the magneto-resistance effect magnetic sensing section 5, for example, in a widthwise direction of a track while a head wiring 8 having a required pattern such as, for example, a spiral pattern is formed at the same time. More particularly, a conductor layer of Cu or the like is formed by plating, sputtering or the like and then selectively removed in a required pattern by etching employing photo-lithography or the like to form a biasing conductor 7 and a head wiring 8.

Then, a window is perforated in the insulating layers 6 on a rear portion of the lower layer thin film magnetic core 3, and an upper layer thin film magnetic core 4 is formed in a required pattern such that it may be magnetically coupled to the lower layer thin film magnetic core 3 directly or by way of a non-magnetic layer of a required thickness through the window. The upper layer thin film magnetic core 4 may be formed such that a magnetic layer of FeNi or the like is formed over an entire region by frame plating or the like or under the application of a required external magnetic field and then selectively removed in a required pattern by etching employing photo-lithography. In this instance, the upper layer thin film magnetic core 4 is formed such that it has, also at a front end of a reduced width thereof, a width selected to be greater than the width of the front end of the lower layer thin film magnetic core 3 by an amount greater than 2 μm, for example, a width of 6 to 8 μm so that the lower layer thin film magnetic core 3 can be opposed with certainty to the upper layer thin film magnetic core 4 with a magnetic gap g of a required track $W_T$ left therebetween to assure a stabilized magnetic characteristic.

Referring to FIGS. 1 and 3, reference characters 37a and 37b denote terminal lead portions formed such that they extend sidewardly and then rearwardly from the electrodes 15a and 15b, respectively: 35a and 35b denote terminal lead portions formed such that they extend rearwardly from the opposite ends of the biasing conductor 7; and 38a and 38 b denote terminal lead portions formed such that they extend rearwardly from or are connected to the opposite ends of the head winding 8. The terminals 35a, 35b, 37a, 37b, 38a and 38b can be formed from conductor patterns which may be formed, at the same step or steps as formation of the electrodes 15a and 15b, biasing conducting 7 and head winding 8, such that they extend from them or may be formed at another step.

Then, the base member 1 including the lower and upper layer thin film magnetic cores 3 and 4 constructed in this manner is polished from a front end thereof to a location as indicated by a chain line a, that is, to a location of the constricted portion 3C of the lower layer thin film magnetic core 3 to form an air bearing surface 2. Consequently, such a compromise thin film magnetic head as shown in FIGS. 1 to 3 is obtained wherein a magnetic gap g having a required track width $W_T$ is formed in a condition wherein it is opened to the air bearing surface 2.

While in the embodiment described above the present invention is applied to a composite thin film magnetic head of a magneto-resistance effect type thin film magnetic head and an inductive type magnetic head, the present invention can be applied to another magneto-resistance effect type thin film magnetic head or the like wherein a magneto-resistance effect type thin film magnetic head or an inductive type thin film magnetic head is constructed solely.

Having now fully described the invention, it will be apparent to one of ordinary skill in the art that many changes and modifications can be made thereto without departing from the spirit and scope of the invention as set forth herein.

What is claimed is:

1. A magneto-resistance effect type thin film magnetic head, comprising a base member, a lower layer thin film magnetic core and an upper layer thin film magnetic core layered on said base member in such a manner that a magnetic gap is formed between front ends thereof and is opened to an opposing face of said magnetic head which is in contact with or opposed to a magnetic record medium, and a magneto-resistance effect magnetic sensing section disposed in said magnetic gap between said lower and upper layer thin film magnetic cores, the front end of said lower layer thin film magnetic core which defines said magnetic gap having a width selected to be smaller than the width of the front end of said upper layer thin film magnetic core which defines said magnetic gap so as to define a track width of said magnetic gap.

2. A magneto-resistance effect type thin film magnetic head according to claim 1, wherein the longitudinal direction of said magneto-resistance effect magnetic sensing section extends rearwardly from said opposing face of said magnetic head away from the magnetic record medium.

3. A magneto-resistance effect type thin film magnetic head according to claim 1, wherein a sensing current flowing through said magneto-resistance effect magnetic sensing section flows rearwardly from said opposing face of said magnetic head away from the magnetic record medium.

4. A magneto-resistance effect type thin film magnetic head according to claim 1, further comprising a biasing conductor disposed on said magneto-resistance effect magnetic sensing section in a direction perpendicular to said magneto-resistance effect magnetic sensing section with an insulating layer interposed therebetween.

5. A magneto-resistance effect type thin film magnetic head according to claim 1, wherein said upper and lower layer thin film magnetic cores have mutually magnetically coupled portions at a location spaced from said magnetic gap.

6. A magneto-resistance effect type thin film magnetic head according to claim 5, wherein a head winding is formed around said magnetically coupled portions of said upper and lower layer thin film magnetic cores.

7. A magneto-resistance effect type thin film magnetic head according to claim 1, wherein the width of said magneto-resistance effect magnetic sensing section is 3 to 5 $\mu$m.

8. A magneto-resistance effect type thin film magnetic head according to claim 1, wherein the width of said magneto-resistance effect magnetic sensing section is smaller than the width of the front end of said lower layer thin film magnetic core.

9. A magneto-resistance effect type thin film magnetic head according to claim 1, wherein the width of said front end of said upper layer thin film magnetic core is greater than the width of said front end of said lower layer thin film magnetic core by an amount greater than 2 $\mu$m.

* * * * *